United States Patent
Lu et al.

(10) Patent No.: US 9,145,147 B1
(45) Date of Patent: Sep. 29, 2015

(54) METHOD AND SYSTEM FOR WARNING A DRIVER OF A MOTOR VEHICLE

(71) Applicant: Ford Global Technologies, LLC, Dearborn, MI (US)

(72) Inventors: Jianbo Lu, Northville, MI (US); Zhengyu Dai, Canton, MI (US); Felix Nedorezov, Rochester Hills, MI (US); Hong Jiang, Birmingham, MI (US); Roger Lyle Huffmaster, Canton, MI (US); Dimitar Petrov Filev, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/196,336

(22) Filed: Mar. 4, 2014

(51) Int. Cl.
| | | |
|---|---|---|
| *G06F 17/00* | (2006.01) | |
| *B60W 50/16* | (2012.01) | |
| *F16H 61/02* | (2006.01) | |
| *B60W 10/02* | (2006.01) | |
| *B60W 10/11* | (2012.01) | |
| *B60W 30/095* | (2012.01) | |

(52) U.S. Cl.
CPC .............. *B60W 50/16* (2013.01); *B60W 10/023* (2013.01); *B60W 10/11* (2013.01); *B60W 30/095* (2013.01); *F16H 61/0213* (2013.01); *F16H 2061/0234* (2013.01)

(58) Field of Classification Search
None
See application file for complete search history.

(56) References Cited

U.S. PATENT DOCUMENTS

| | | | |
|---|---|---|---|
| 4,136,331 A | 1/1979 | Cullen | |
| 6,067,497 A | 5/2000 | Sekine et al. | |
| 6,188,316 B1 * | 2/2001 | Matsuno et al. | ............. 340/441 |
| 7,327,237 B2 | 2/2008 | Kimura et al. | |
| 7,369,042 B2 | 5/2008 | Osaka et al. | |
| 7,453,374 B2 * | 11/2008 | Koike et al. | .................. 340/903 |
| 7,821,384 B2 | 10/2010 | Kocher | |
| 2012/0169488 A1 | 7/2012 | Thiel et al. | |

(Continued)

FOREIGN PATENT DOCUMENTS

DE            10248180            4/2004

OTHER PUBLICATIONS

Reinisch et al., "*Gear Shifts as Situation Adapted Pre-Warning of the Driver*", ATZ Worldwide eMagzine Edition, 2011-03.

(Continued)

*Primary Examiner* — Dirk Wright
(74) *Attorney, Agent, or Firm* — Diederiks & Whitelaw, PLC

(57) ABSTRACT

An apparatus and method for altering the drivability of a vehicle so as to alert a driver of the vehicle of a potentially hazardous condition. The vehicle has at least one sensor configured to detect the potentially hazardous potential. Additionally, the vehicle has a control system for directing a transmission of the vehicle to perform a transmission operation that catches the driver's attention by generating an acceleration or deceleration. The transmission operation is preferably an upshift, a downshift, an unlocking of a torque converter lockup clutch or a locking of the lockup clutch. In one embodiment, the control system directs the transmission to perform more than one transmission operation, the transmission operations defining a transmission operation cycle. In a preferred embodiment, more than one transmission operation cycle is performed. Potentially hazardous conditions include traffic in front of the vehicle, a second vehicle approaching from the rear, an upcoming curve in the road, an approaching speed limit or an upcoming banked portion of the road.

25 Claims, 5 Drawing Sheets

(56) References Cited

U.S. PATENT DOCUMENTS

2012/0293313 A1 11/2012 Yu et al.
2013/0131905 A1 5/2013 Green et al.

OTHER PUBLICATIONS

Reinisch et al., "*Schaltworgaenge Zur Situationsangepassten Vorwarnung des Fahrers*", vol. 113, No. 3, pp. 210-214, 2011.

* cited by examiner

METHOD AND SYSTEM FOR WARNING A DRIVER OF A MOTOR VEHICLE

BACKGROUND OF THE INVENTION

The present invention pertains to a control system for a motor vehicle, and, more particularly, to using transmission shift modulation to alert a driver of the vehicle for a potential driving hazard.

Modern vehicles often include hazard warning and driver assist systems that alert drivers of potential driving hazards, with some systems actually intervening in the operation of the vehicles to avoid those hazards. There are a variety of such systems including, for example, adaptive cruise control systems, blind spot detection and warning systems, city safety systems, collision mitigation by braking systems, forward collision warning systems and rear collision warning systems. These systems use forward, side and rear sensors to determine potential driving hazards, either warning the driver or intervening, such as by applying the vehicle's brakes, to avoid the driving hazard. The forward sensors generally provide environmental information such as traffic conditions and road conditions (e.g., road curvature) in front of the vehicle, while the side sensors measure environmental information to the side of the vehicle such as whether a second vehicle is in the driver's blind spot. The rear sensors are typically used for reverse driving to detect obstacles or potential rear-end collisions from another vehicle.

These systems use audio or visual cues based on the detection of a potential hazard to warn the driver. Unfortunately, because of a proliferation of such cues, along with other driver distractions, they do not always catch the driver's prompt attention. Therefore, it would be beneficial to provide another cue or warning that effectively attracts the driver's attention and does not require the driver to look away from the road.

SUMMARY OF THE INVENTION

The present invention is directed to an apparatus and method for altering the drivability of a vehicle so as to alert a driver of the vehicle for a potentially hazardous condition. Vehicle drivability requirements show that drivers are usually very sensitive to mild changes in vehicle deceleration or acceleration due to sudden upshifting or downshifting of a transmission. As a result, drivability is typically the primary goal of shift schedule, clutch lockup schedule and shift/clutch control strategies for automatic transmission system development. For example, during launch (i.e., when a vehicle begins moving from a stop), 5 degrees of foot rotation on an accelerator pedal would generate a vehicle acceleration that might exceed a peak value of 0.5 g. The deceleration level during engine braking (i.e., no service brake is applied) would generate a vehicle deceleration that is less than –0.15 g. When a transmission shifting causes vehicle acceleration or deceleration outside certain bounds around a well-calibrated target value, a driver's attention is gained, despite other distractions. Accordingly, drivetrain drivability development attempts to improve shift quality related to the driver's feel of pedal movement and the vehicle's acceleration or deceleration in order to increase driver satisfaction. In the context of a warning system, however, drivability constraints can be ignored temporarily so that a warning is provided to the driver.

In a preferred embodiment of the invention, a vehicle has at least one sensor configured to detect a potentially hazardous condition. Additionally, the vehicle has a control system for directing a transmission of the vehicle to perform a transmission operation that catches the driver's attention by generating an acceleration or deceleration. The transmission operation is preferably an upshift, a downshift, an unlocking of a torque converter lockup clutch or a locking of the lockup clutch. In one preferred embodiment, the control system directs the transmission to perform more than one transmission operation, the transmission operations defining a transmission operation cycle. In another preferred embodiment, more than one transmission operation cycle is performed. Potentially hazardous conditions include traffic in front of the vehicle, a second vehicle approaching from the rear, an upcoming curve in the road, an approaching speed limit or an upcoming-banked portion of the road.

Additional objects, features and advantages of the present invention will become more readily apparent from the following detail description of preferred embodiments when taken in conjunction with the drawings wherein like reference numerals refer to corresponding parts in the several views.

BRIEF DESCRIPTION OF THE DRAWINGS

FIG. 3A and FIG. 2B are graphs showing the acceleration and velocity of the motor vehicle when shift changes cause vehicle acceleration changes that are used as warnings to a driver;

DETAILED DESCRIPTION OF THE PREFERRED EMBODIMENTS

Detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
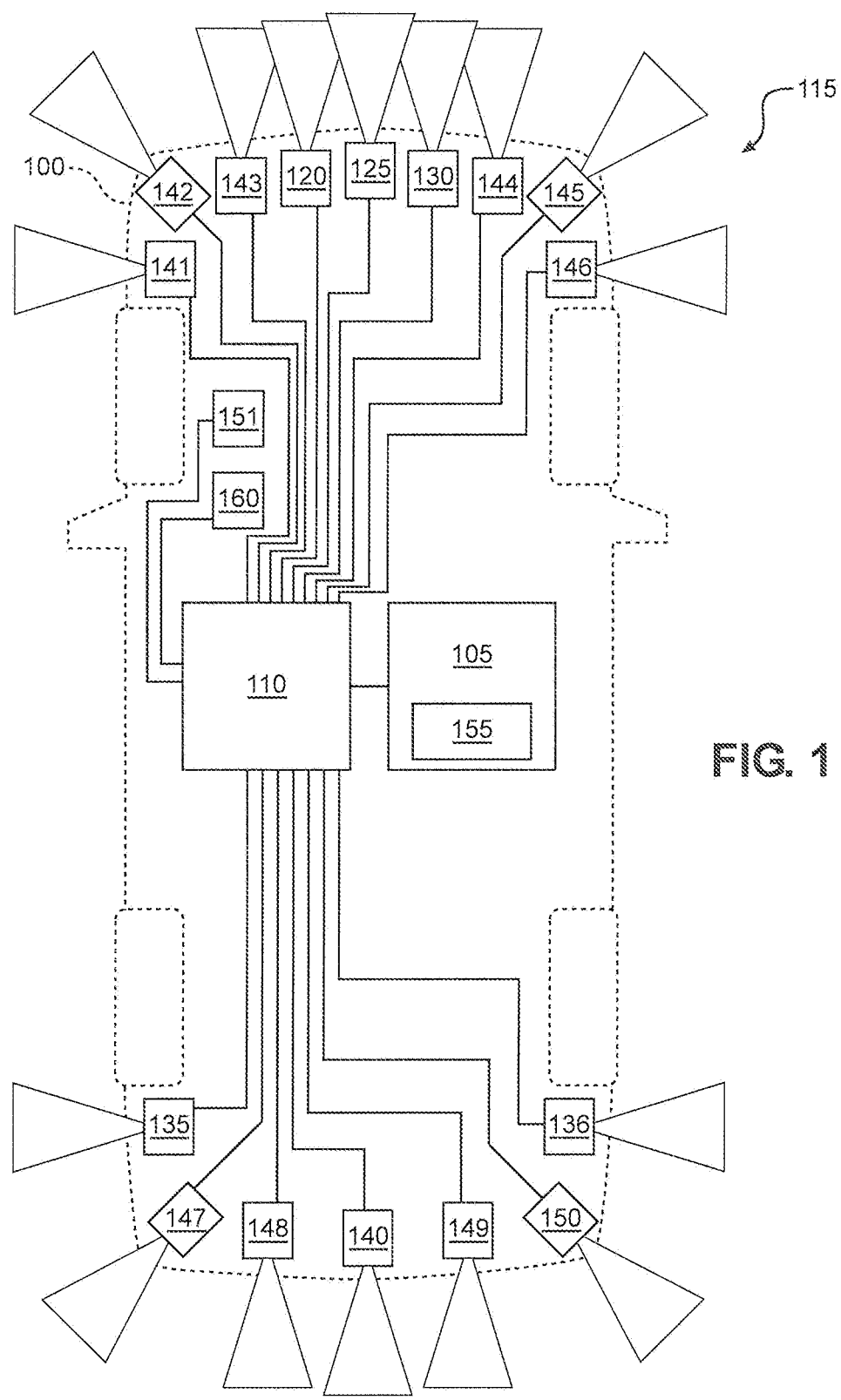
FIG. 1 is a schematic view of a motor vehicle in accordance with the present invention.

With initial reference to FIG. 1, there is shown a motor vehicle 100 in accordance with the present invention. Vehicle 100 has an automatic transmission 105, a control system including a controller 110 and a plurality of sensors 115. Specifically, the plurality of sensors 115 includes a front view camera 120, front view lidar 125, front radar 130, side radar 135, 136, a rear view camera 140 and a plurality of ultrasonic sensors 141-150. The plurality of sensors 115 is used in connection with the at least one control feature, which is implemented by controller 110 and is preferably at least one of the following: adaptive cruise control, blind spot detection, city safety, collision mitigation by braking, forward collision warning and rear collision warning. The plurality of sensors 115 sends data to controller 110, which interprets the data, based on the at least one control feature, to determine any potential driving hazards. Information about potential hazards is then used by controller 110, which optionally combines this information with data from other sensors, such as a brake sensor 151 used for brake control functions, a transmission sensor 155 used for automatic transmission controls, and a throttle sensor 160 used for throttle controls, to determine an appropriate vehicle response.

The vehicle response is preferably a warning for the driver or an intervention in the control of vehicle 100 or both a warning and an intervention. Generally, the warning is an audio or visual cue, such as a noise, a light or a text communication on a display not separately shown. In a preferred embodiment, the warning is a vehicle acceleration or deceleration change felt by the driver as a result of a transmission operation performed by transmission 105, as will be discussed below. Additionally, more than one warning or type of warning may be used. The intervention normally involves applying the brakes of vehicle 100 or steering vehicle 100 around a hazard. Once controller 110 has determined an appropriate response, controller 110 sends a control signal to a relevant control system, such as transmission 105, the display or the brakes of vehicle 100, for example. The vehicle control system then performs an action in accordance with the control signal.

In the preferred embodiment mentioned above, the driver is warned of a potential hazard by a change in deceleration or acceleration caused by a transmission operation such as an upshift, a downshift, an unlocking of a lockup clutch of a torque converter or a locking of the lockup clutch. As discussed previously, drivers are very sensitive to such changes, especially when they are outside the comfort zone around the calibrated target values, and those changes make for especially effective warnings. Additionally, in contrast to the other visual driver warnings, the acceleration or deceleration changes resulting from the transmission operation do not cause the driver to take his eyes off the road in order to perceive the warning. To accomplish this, controller 110 is in communication with transmission 105, which allows controller 110 to send control signals to transmission 105.

Figure 2A:
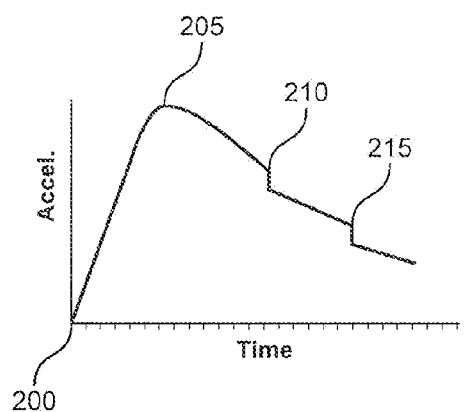
FIG. 2A and FIG. 2B are graphs showing examples of target accelerations of the motor vehicle that are consistent with good drivability.
Figure 2B:
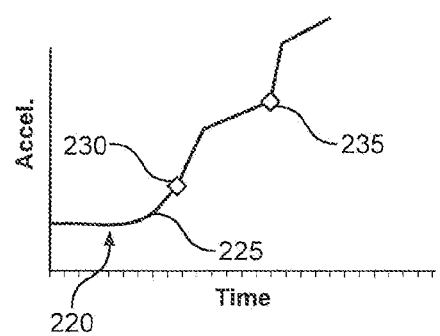

Normally, controller 110 controls shifting of transmission 105 in a manner consistent with good driver feel, as shown in FIGS. 2A and 2B, which represent shift patterns for good drivability. In FIG. 2A, a launch of vehicle 100 is shown. At point 200, vehicle 100 is stopped. When vehicle 100 begins moving, acceleration of vehicle 100 increases steadily until peak 205 when the driver begins reducing the acceleration. As acceleration continues to decrease, controller 110 sends a control signal to transmission 105 that tells transmission 105 to shift from a first gear to a second gear, shown at point 210. This causes the acceleration of vehicle 100 to decrease even further. A second upshift from the second gear to a third gear is shown at point 215. If properly executed for good drivability, these upshifts will not generate vehicle acceleration changes that are far from the target values shown in FIG. 2A, and, hence, they will not attract the driver's attention. Similarly, FIG. 2B shows a situation in which a driver requests additional acceleration. At area 220, acceleration is relatively constant. Acceleration begins increasing at point 225, which indicates that the driver has requested additional acceleration. A first downshift occurs at point 230 when controller 110 sends a control signal to transmission 105. A second downshift occurs at point 235. As before, these downshifts will not generate vehicle acceleration changes that are far from the target values shown in FIG. 2B, and hence, they will not attract the driver's attention.

Figure 3A:
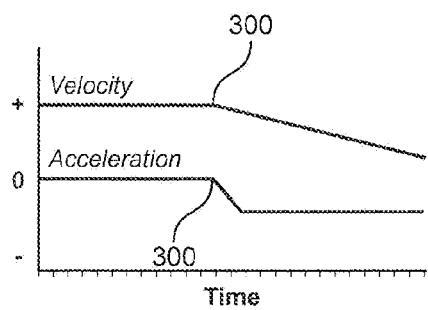
Figure 3B:
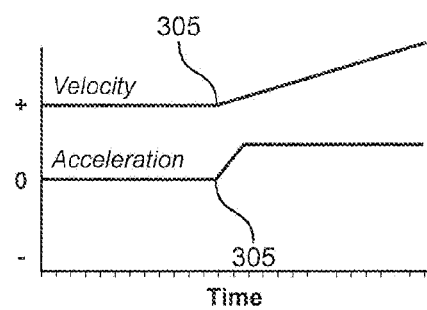

In contrast, FIGS. 3A and 3B show shifts undertaken to generate vehicle acceleration changes that are outside the comfort zones defining good drivability which can catch the driver's attention, and, hence, can be used to warn the driver of a potential hazard. These shifts are purposefully conducted in a manner that can maximally attract the driver's attention. In FIG. 3A, vehicle 100 is initially moving at a generally constant velocity (i.e., acceleration is essentially 0). In response to a potential hazard detected by plurality of sensors 115, controller 110 sends a control signal to transmission 105, which, at point 300, directs transmission 105 to perform an upshift. This upshift causes a deceleration that is noticed by the driver, but that does not significantly change the instantaneous velocity of vehicle 100. The deceleration thus serves as a warning to the driver. In FIG. 3B, vehicle 100 is again initially moving at a generally constant velocity. In response to a potential hazard, controller 110 causes transmission 105 to perform a downshift at point 305. The downshift causes an acceleration, which again does not significantly change the instantaneous velocity of vehicle 100, but which warns the driver. In a preferred embodiment, controller 110 directs transmission 105 to perform a short-duration upshift followed by a downshift or a short-duration downshift followed by an upshift. In yet another preferred embodiment, controller 110 directs transmission 105 to perform more than one such upshift-downshift or downshift-upshift cycle.

Figure 4:
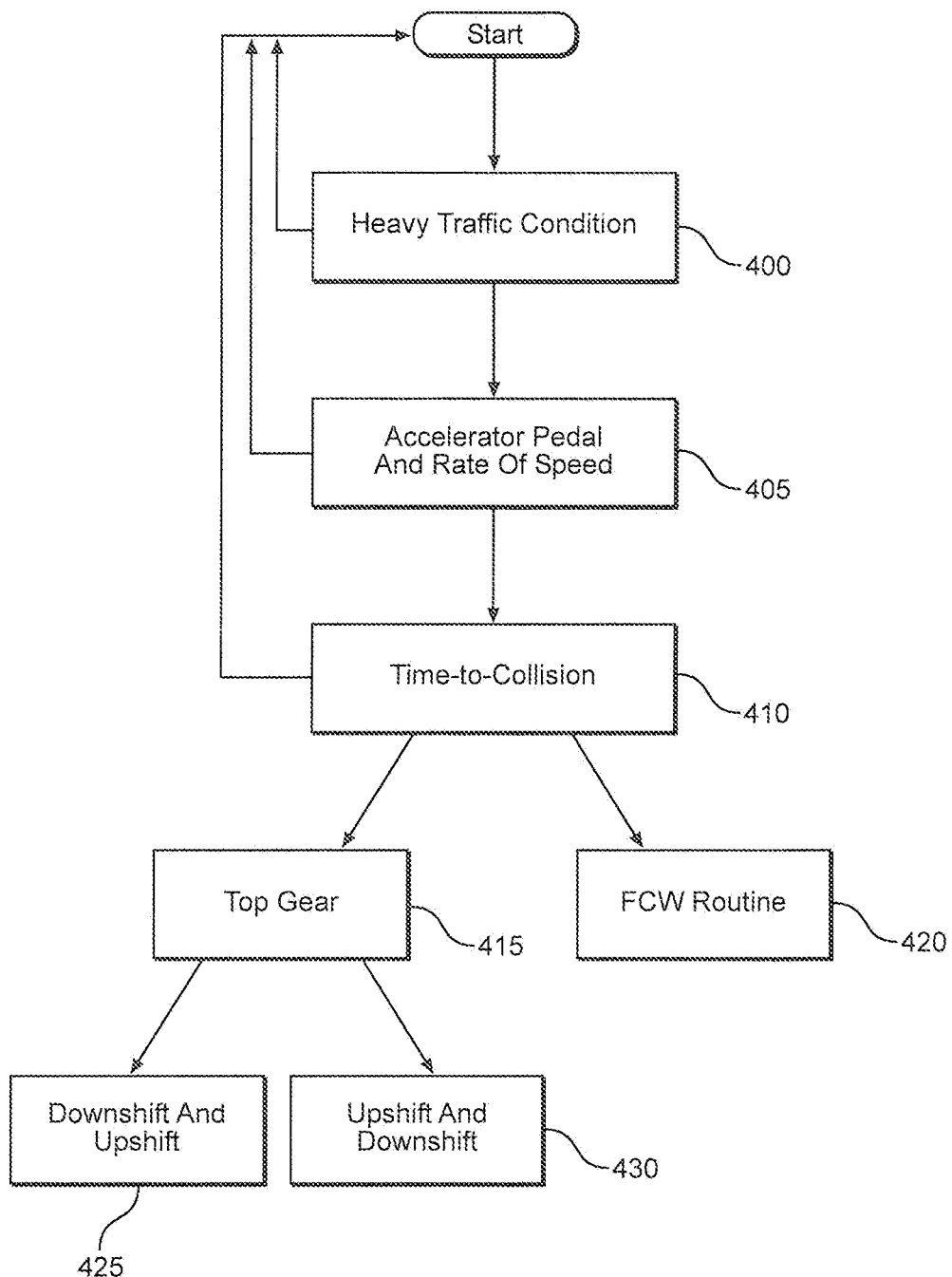
FIG. 4 is a flowchart showing Heavy Traffic Shift Modulation in accordance with the present invention.

With reference to FIG. 4, there is shown a flowchart of a shift schedule or shifting control that represents a Heavy Traffic Shift Modulation (HTSM), which is preferably used during highway driving. In HTSM, controller 110 makes use of front-facing sensors, selected from plurality of sensors 115. At step 400, controller 110 determines, with plurality of sensors 115, whether there is a heavy traffic condition ahead (usually about 200 meters ahead). If so, at step 405, controller 110 determines whether the driver has eased up on an accelerator pedal and whether vehicle 100 is traveling at a high rate of speed or above a predetermined rate of speed (for example, 50 miles per hour). Such a speed determination may be made by referencing appropriate measured or estimated signals in the electronic control units (ECUs) for powertrain controls, brake controls or drivetrain controls of vehicle 100. If the driver has not eased up on the accelerator pedal sufficiently and vehicle 100 is traveling at a high rate of speed (e.g., 50 MPH or greater), then controller 110 continues to step 410. At step 410, controller 110 determines a time-to-collision based on the speed of vehicle 100 and the distance to the closest obstacle (e.g., another vehicle) in the collision path of vehicle 100. If the time-to-collision is below a threshold set for HTSM, but above a threshold set for forward collision warning (FCW), then controller proceeds to step 415. If the time-to-collision is below the threshold for FCW, then controller 110 proceeds to step 420. In a preferred embodiment, the time-to-collision threshold is between 3 and 9 seconds for HTSM and between 1 and 3 seconds for FCW, and those thresholds vary with the current speed of vehicle 100 and the distance range of the forward vision sensors.

At step 415, controller 110 begins an HTSM routine. The gear that transmission 105 is in before HTSM begins is called the reference gear. HTSM starts by determining whether the reference gear is the top gear of transmission 105. If so, controller 110 moves to step 425 and conducts one or more cycles of a downshift from the reference gear and an upshift back to the reference gear (called a downshift-backshift or DB cycle). More specifically, the DB cycle downshifts one gear below the reference gear (top gear) and then upshifts back to the reference gear. In a preferred embodiment, the DB cycle takes 2 or fewer seconds or takes a time value that helps generate uncomfortable changes in vehicle acceleration and deceleration while meeting the physical constraints of transmission hardware. If the reference gear of transmission 105 is not the top gear, controller 110 moves to step 430 and conducts one or more cycles of upshift-backshift-downshift (called a UBD cycle). More specifically, a UBD cycle upshifts one gear above the reference gear, downshifts back to the reference gear and then downshifts again to one gear below the reference gear. In the preferred embodiment, a UBD cycle takes 4 or fewer seconds or takes a time value that helps generate uncomfortable changes in vehicle acceleration and deceleration while meeting the physical constraints of transmission hardware. These warnings are intended to prompt the driver to ease off the accelerator pedal or let go of the accelerator pedal entirely. As a result, it is preferable to perform an upshift-backshift-downshift cycle, rather than a downshift-backshift-upshift cycle, so that deceleration is produced first. Additionally, in certain cases, several cycles of torque converter lockup clutch lock and unlock (called a CLU cycle) are conducted such that transmission 105 is alternately disconnected from and then connected to an engine so as to generate deceleration or acceleration changes. The CLU cycle can be conducted in a much shorter duration than a DB or a UBD cycle, and, hence, CLU cycles can be used in cases where vehicle 100 is traveling at a high speed.

As mentioned above, when the time-to-collision is below the threshold set for FCW, then controller 110 bypasses steps 415, 425 and 430 (i.e., the HTSM routine) and proceeds to step 420, which is an FCW routine. In one embodiment of the FCW routine, controller 110 sends a control signal to generate a warning, such as an audio alert or a light in a heads-up display. If necessary, the FCW routine can be followed by application of the brakes of vehicle 100 as in a collision mitigation by braking system.

Figure 5:
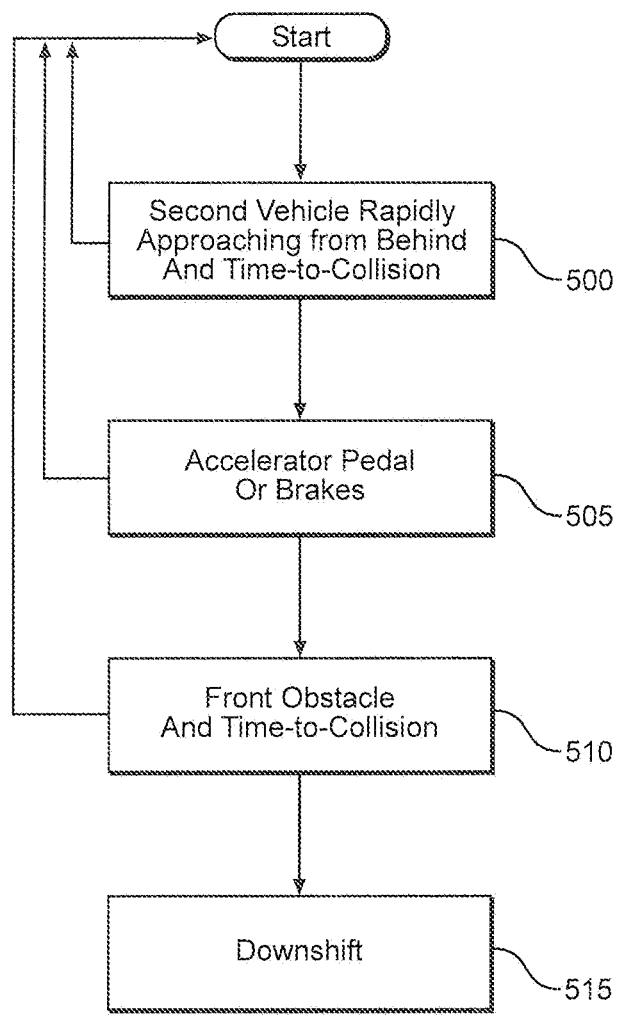
FIG. 5 is a flowchart showing Rear-End Shift Modulation in accordance with the present invention.

FIG. 5 shows a flowchart of a shift schedule or shifting control that represents a Rear-End Shift Modulation (RESM), which is preferably used during highway driving (i.e., above approximately 50 MPH). In RESM, controller 110 makes use of rear- and side rear-facing sensors, selected from plurality of sensors 115. At step 500, controller 110 determines, with plurality of sensors 115, whether there is a second vehicle that is rapidly approaching vehicle 100 from behind and whether a time-to-collision is below a specified threshold, which is preferably between 3 and 9 seconds for example. If so, controller 110 proceeds to step 505 and determines, via brake sensor 151 or throttle sensor 160 for example, whether the driver of vehicle 100 is pressing the accelerator pedal in a steady, but low manner, whether the driver has stopped pressing the accelerator pedal or whether the driver has applied the brakes. If any of these are true, then controller 110 moves to step 510. At step 510, front-facing sensors, selected from the plurality of sensors 115, are used to detect whether there is an obstacle or vehicle in front of vehicle 100 with a small time-to-collision. If not, then controller 110 proceeds to step 515 and sends a control signal to transmission 105 directing transmission 105 to perform a downshift so as to generate an uncomfortable level of acceleration and warn the drive to take action to move the vehicle forward. Specifically, the warning is intended to prompt the driver to accelerate or increase accelerating. Additionally, the downshift has the added benefit of enabling an increased rate of acceleration and vehicle driving torque. Accordingly, in RESM, it is preferable to perform a downshift instead of an upshift, in contrast with HTSM where deceleration is preferred.

Figure 6:
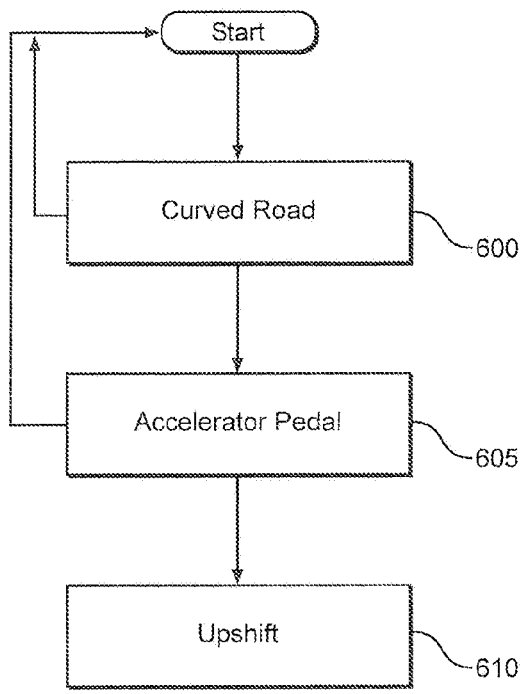
FIG. 6 is a flowchart showing Curve Over-Speed Shifting in accordance with the present invention.

FIG. 6 shows a flowchart of a shift schedule or shifting control that represents Curve Over-Speed Shifting (CSS). At step 600, controller 110 determines, with plurality of sensors 115, whether the road ahead of vehicle 100 is curved. Specifically, in one embodiment, controller 110 makes use of an electronic horizon or onboard vision sensor system, for example. If the road is curved, then controller 110 moves to step 605 where controller 110 determines, via throttle sensor 160 for example, whether the driver has eased up on the accelerator pedal. If not, controller 110 proceeds to step 610 and sends a control signal to transmission 105 to perform an upshift, if available. The availability of an upshift is typically determined by transmission sensor 155. The upshift generates a deceleration to prompt the driver to ease off or release the accelerator pedal. An upshift is preferred to a downshift in this embodiment because the upshift causes deceleration, which is beneficial for most curves. In one embodiment, after the upshift, controller 110 sends a control signal to the brakes of vehicle 100 to begin braking. In another embodiment, if easing off the accelerator pedal is insufficient, controller 110 implements a curve control routine that controls the motion of vehicle 100, such as by braking or steering, so that vehicle 100 safely navigates the curve in the road.

Figure 7:
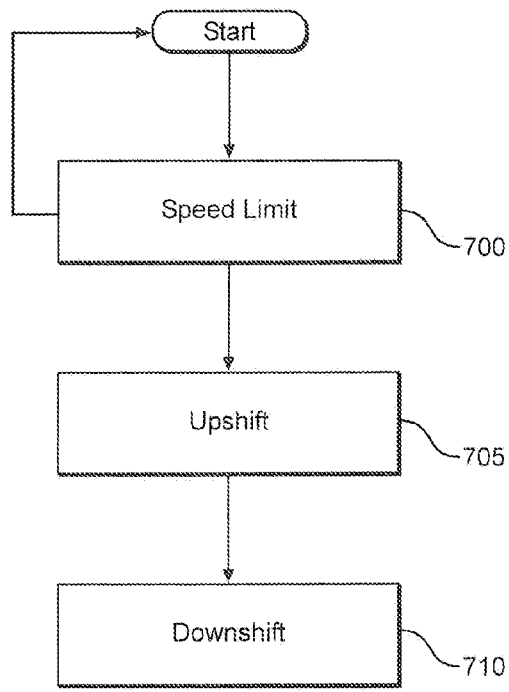
FIG. 7 is a flowchart showing Speed Limit Shifting in accordance with the present invention.

With reference to FIG. 7, there is shown a flowchart of a shift schedule or shifting control that represents Speed Limit Shifting (SLS). At step 700, controller 110 determines whether vehicle 100 is approaching the speed limit for the road. In one embodiment, this determination is made by a combination of a sensor for determining the speed of vehicle 100 and a system for determining the speed limit, such as a navigation or global positioning system. If vehicle 100 is approaching the speed limit (e.g., within 5 MPH of the speed limit), then controller moves to step 705 and sends a control signal to transmission 105 directing transmission 105 to perform an upshift, if available. As mentioned above, the availability of an upshift is typically determined by transmission sensor 155. The deceleration provided by the upshift warns the driver to begin easing off the accelerator pedal. Transmission 105 then performs a downshift back to the original gear at step 710. In SLS, an upshift then downshift back to the reference gear (called an upshift-backshift or UB cycle) is preferred because it causes deceleration, which is also what the warning prompts the driver to do. In the UB cycle, the duration on the upshifted gear might be made longer than the duration on the reference gear. In another embodiment, the control system performs an upshift to warn the driver when vehicle 100 is traveling at a speed that is a specified amount or percentage over the speed limit rather than warning the driver as vehicle 100 approaches the speed limit. In one embodiment, the upshift occurs when vehicle 100 is traveling 10 MPH or more over the speed limit. In another embodiment, the upshift occurs when vehicle 100 exceeds the speed limit by 20% or more (i.e., vehicle 100 is traveling at a rate of speed greater than 120% of the speed limit, which would be 60 MPH when the speed limit is 50 MPH). If the vehicle is travelling in top gear, one or several DB cycles might be performed to warn the driver. The difference between the DB cycles used in SLS and the DB cycles used in HTSM is that the duration of the cycle is different.

Figure 8:
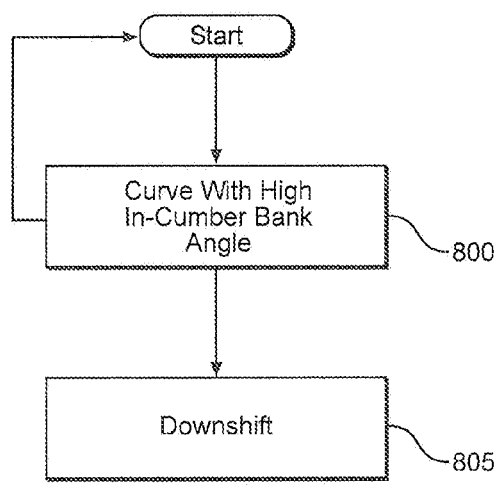
FIG. 8 is a flowchart showing Road Bank Shifting in accordance with the present invention.

FIG. 8 shows a flowchart of a shift schedule or shifting control that represents Road Bank Shifting (RBS). At step 800, controller 110 determines whether vehicle 100 is traveling on a road with a curve having a high, in-camber bank angle. In one embodiment, a forward vision sensor or a sensor that determines an angular position of vehicle 100 determines the bank angle. Typically, in such a curve, vehicle 100 is more stable at higher speeds, which encourages the driver to corner at a higher speed. Therefore, at step 805, if controller 110 has determined that the road has a curve with a high, in-camber bank angle, then controller 110 sends a signal to transmission 105 directing transmission 105 to perform a downshift. The downshift generates a feeling of acceleration and prepares vehicle 100 for the driver's increased torque demand. If the driver does not respond to RBS, one or several DB cycles might be used to warn the driver. The difference between the DB cycles used in RBS and the DB cycles used in the previous cases where vehicle 100 was traveling in top gear is that the duration of the cycle is different.

The specific shift schedules and shifting controls described above are intended as examples. Controller 110 is capable of directing transmissions 105 to perform transmission operations that serve as warnings in other contexts as well. Furthermore, other patterns and durations of upshifts, downshifts, lockup clutch locks and lockup clutch unlocks are usable in connection with the above-described embodiments. The only limitation is that the transmission operations be conducted in a manner that warns the driver. When vehicle 100 is moving at a generally constant rate of speed (i.e., the driver, or a cruise control system, is not attempting to increase or decrease a velocity of vehicle 100), an acceleration of deceleration of as little as 0.1 g can be sufficient to gain the driver's attention. If possible, the shifting is preferably conducted so as to cause acceleration (through a downshift) when a driver should be accelerating and deceleration (through an upshift) when the driver should be decelerating.

Although described with reference to several embodiments, it should be readily understood that various changes or modifications, both major and minor, could be made to the invention without departing from the spirit thereof. For example, in one embodiment, vehicle 100 includes more or fewer sensors than described. These sensors are the same types as described above or any other type known in the art. Additionally, in another embodiment, a sensor, such as transmission sensor 155, is actually more than one sensor. Alternatively, several sensors are combined into a single sensor. Similarly, other features known in the art are optionally included in vehicle 100. Also, in yet another embodiment, controller 110 includes more than one control system or is instead a simple system with a single controller. In general, the invention is only intended to be limited by the scope of the following claims.

The invention claimed is:

1. A method for warning a driver of a motor vehicle including at least one sensor for detecting a potentially hazardous condition, an automatic transmission and a controller, said method comprising:
    detecting a potentially hazardous condition with the at least one sensor; and
    alerting the driver by directing the transmission, with the controller, to perform an upshift or unlock a lockup clutch of a torque converter of the automatic transmission when the potentially hazardous condition is detected.

2. The method of claim 1, wherein performing the upshift or unlocking the lockup clutch constitutes a first transmission operation, further comprising:
    directing, with the controller, the transmission to perform a second transmission operation at a predetermined time after the first transmission operation, thus defining a first transmission operation cycle; and
    directing the transmission to perform a second transmission operation cycle including a third transmission operation and a fourth transmission operation.

3. The method of claim 2, wherein performing the third transmission operation includes performing an upshift or unlocking a lockup clutch of a torque converter of the automatic transmission, and wherein performing the second and fourth transmission operations includes performing a downshift or locking the lockup clutch.

4. The method of claim 1, wherein detecting the potentially hazardous condition further includes:
    determining a traffic condition in front of the vehicle;
    determining whether the driver is requesting to slow the vehicle;
    determining if the vehicle is traveling above a predetermined rate of speed; and
    determining a time-to-collision.

5. The method of claim 1, wherein detecting the potentially hazardous condition further includes:
    determining a curvature or a degree of banking of a road in front of the vehicle; and
    determining whether the driver is requesting to slow the vehicle.

6. The method of claim 1, wherein detecting the potentially hazardous condition further includes:
    determining a speed limit of a road on which the vehicle is traveling; and
    directing the transmission to perform the upshift if the vehicle is exceeding the speed limit by a predetermined amount or percentage.

7. A method for warning a driver of a first motor vehicle including at least one sensor for detecting a potentially hazardous condition, an automatic transmission and a controller, said method comprising:
    detecting, with the at least one sensor, a second vehicle approaching the first vehicle from behind; and
    alerting the driver by directing the transmission, with the controller, to perform a transmission operation that generates an acceleration when the second vehicle is detected.

8. The method of claim 7, wherein performing the transmission operation that generates an acceleration includes performing a downshift or locking a lockup clutch of a torque converter of the automatic transmission.

9. The method of claim 7, wherein detecting the second vehicle approaching the first vehicle from behind further includes:
    determining a time-to-collision;
    determining whether the driver is requesting to increase a speed of the first vehicle; and
    determining whether there is a low time-to-collision with an obstacle in front of the first vehicle.

10. A method for warning a driver of a motor vehicle including at least one sensor for detecting a potentially hazardous condition, an automatic transmission and a controller connected to the at least one sensor and the transmission, said method comprising:
    detecting a potentially hazardous condition with the at least one sensor; and
    alerting the driver by directing the transmission, with the controller, to perform at least two transmission operations, the transmission operations generating an acceleration or a deceleration, when the potentially hazardous condition is detected with the at least one sensor.

11. The method of claim 10, wherein performing the at least two transmission operations includes performing a downshift, performing an upshift, locking a lockup clutch of a torque converter of the automatic transmission or unlocking the lockup clutch.

12. The method of claim 10, wherein directing the transmission, with the controller, to perform at least two transmission operations includes directing a first transmission operation and a second transmission operation, and further includes directing the transmission to perform the second transmission operation a predetermined time after the first transmission operation.

13. The method of claim 12, wherein the first transmission operation and the second transmission operation define a first transmission operation cycle, further comprising:
   directing the transmission to perform a second transmission operation cycle including a third transmission operation and a fourth transmission operation.

14. The method of claim 10, wherein detecting the potentially hazardous condition further includes:
   determining a speed limit of a road on which the vehicle is traveling; and
   directing the transmission to perform an upshift if the vehicle is exceeding the speed limit by a predetermined amount or percentage.

15. The method of claim 10, wherein detecting the potentially hazardous condition further includes:
   detecting a second vehicle approaching the vehicle from behind.

16. The method of claim 15, wherein detecting the second vehicle approaching the vehicle from behind further includes:
   determining a time-to-collision;
   determining whether the driver is requesting to increase a speed of the vehicle; and
   determining whether there is a low time-to-collision with an obstacle in front of the vehicle.

17. A control system for a motor vehicle with an automatic transmission comprising:
   at least one sensor configured to detect a potentially hazardous condition; and
   a controller configured to direct the automatic transmission to perform a first transmission operation if the potentially hazardous condition is detected, wherein the controller is further configured to direct the transmission to perform a second transmission operation shortly after the first transmission operation.

18. The control system of claim 17, wherein performing the first transmission operation includes performing an upshift or unlocking a lockup clutch of a torque converter of the automatic transmission, and wherein performing the second transmission operation includes performing a downshift or locking the lockup clutch.

19. The control system of claim 17, wherein the first and second transmission operations define a first transmission operation cycle, and wherein the control system is further configured to direct the transmission to perform a second transmission operation cycle including a third transmission operation and a fourth transmission operation.

20. The control system of claim 17, wherein the controller is further configured to:
   determine a traffic condition in front of the vehicle;
   determine whether a driver has eased up on an accelerator pedal;
   determine whether the vehicle is traveling above a predetermined rate of speed; and
   determine a time-to-collision.

21. The control system of claim 17, wherein the controller is further configured to:
   determine a curvature or a degree of banking of a road in front of the vehicle; and
   determine whether a driver has eased up on an accelerator pedal.

22. The control system of claim 18, wherein the control system is further configured to:
   determine a speed limit of a road on which the vehicle is traveling;
   direct the transmission to perform the upshift if the vehicle is exceeding the speed limit by a predetermined amount or percentage.

23. A control system for a first motor vehicle with an automatic transmission comprising:
   at least one sensor configured to detect a second vehicle approaching the first vehicle from behind; and
   a controller configured to direct the transmission to:
      perform a transmission operation if the second vehicle approaching the vehicle from behind is detected;
      determine a time-to-collision;
      determine whether a driver is requesting to increase a speed of the vehicle; and
      determine whether there is a low time-to-collision with an obstacle in front of the vehicle.

24. The control system of claim 23, wherein performing the transmission operation includes performing a downshift.

25. A method for warning a driver of a motor vehicle including at least one sensor, a controller and an automatic transmission having a torque converter with a lockup clutch, said method comprising:
   detecting a potentially hazardous condition with the at least one sensor; and
   alerting the driver, when the potentially hazardous condition is detected, by directing the transmission, with the controller, to lock or unlock the lockup clutch to generate an acceleration or deceleration.

* * * * *